June 13, 1950     A. H. GOREY     2,511,157
PHOTOGRAPHIC CAMERA WITH READILY
REMOVABLE CURTAIN SHUTTER UNIT
Original Filed Oct. 23, 1945     9 Sheets-Sheet 1
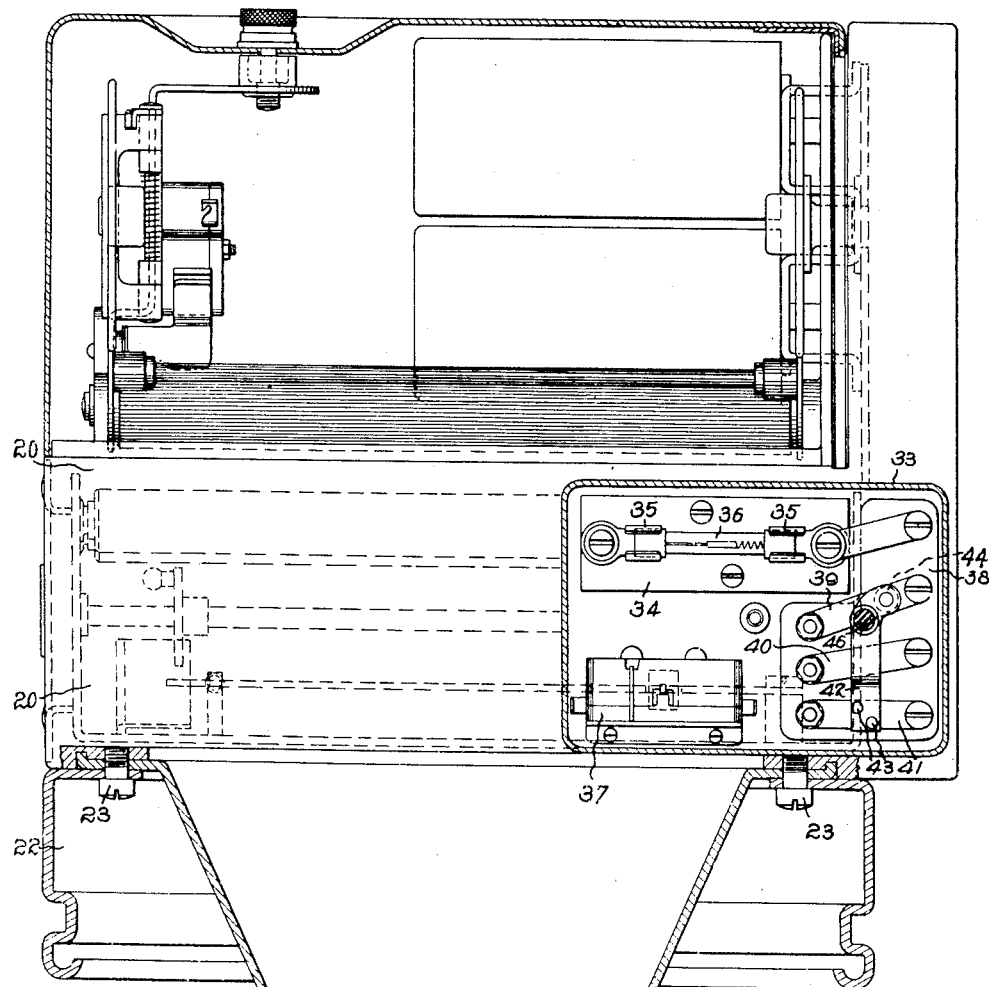
Fig. 1.
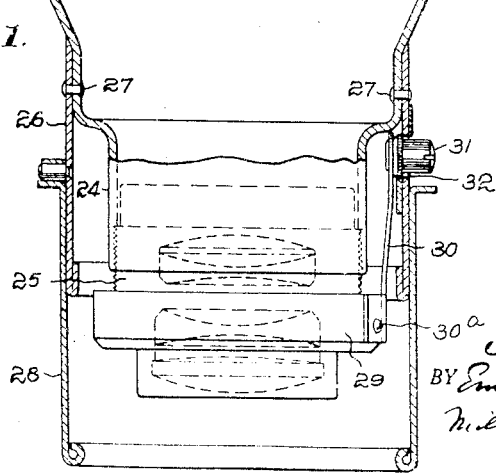
INVENTOR.
Archie H. Gorey
BY
Attys

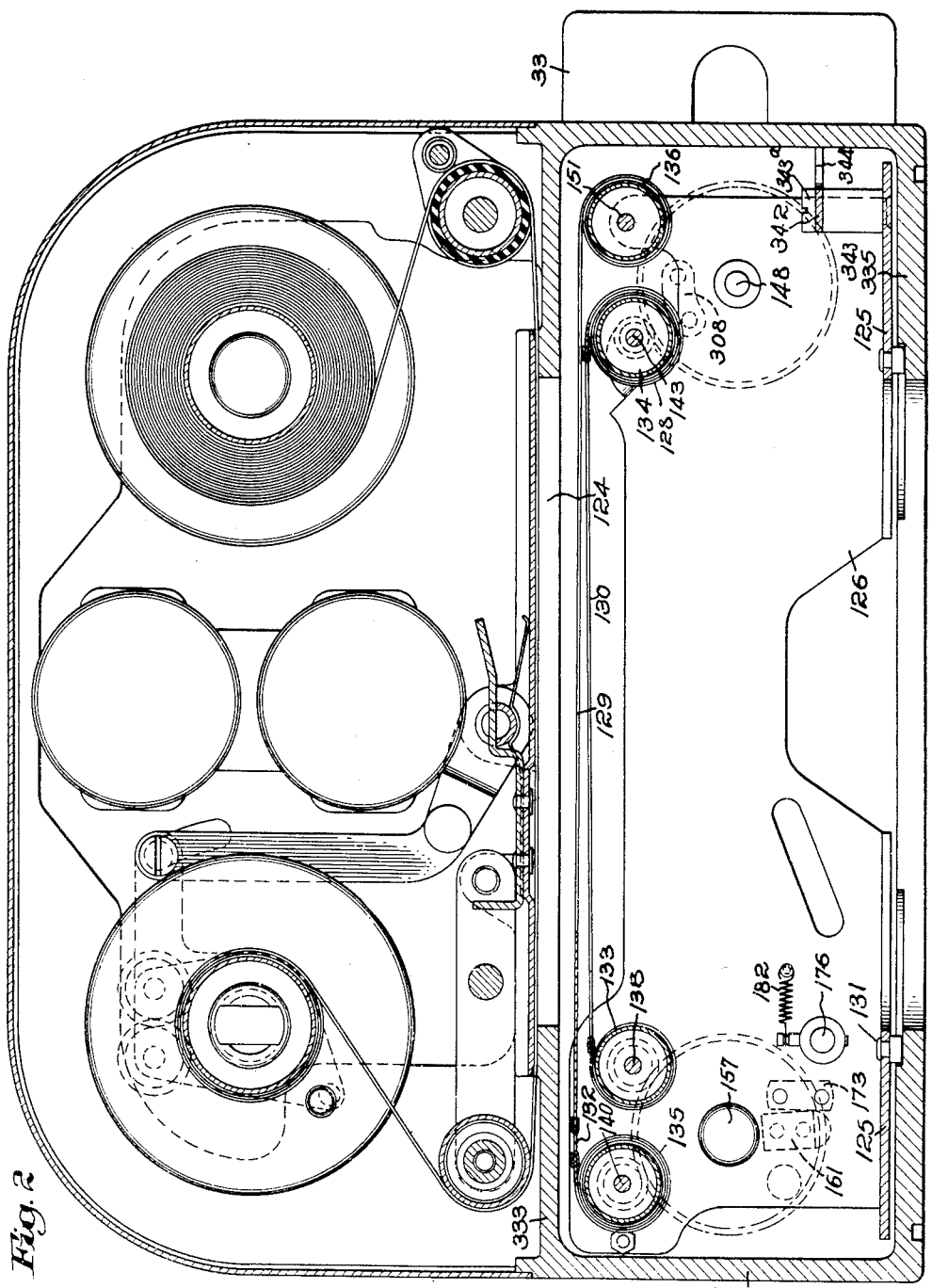

June 13, 1950 A. H. GOREY 2,511,157
PHOTOGRAPHIC CAMERA WITH READILY
REMOVABLE CURTAIN SHUTTER UNIT
Original Filed Oct. 23, 1945 9 Sheets-Sheet 3
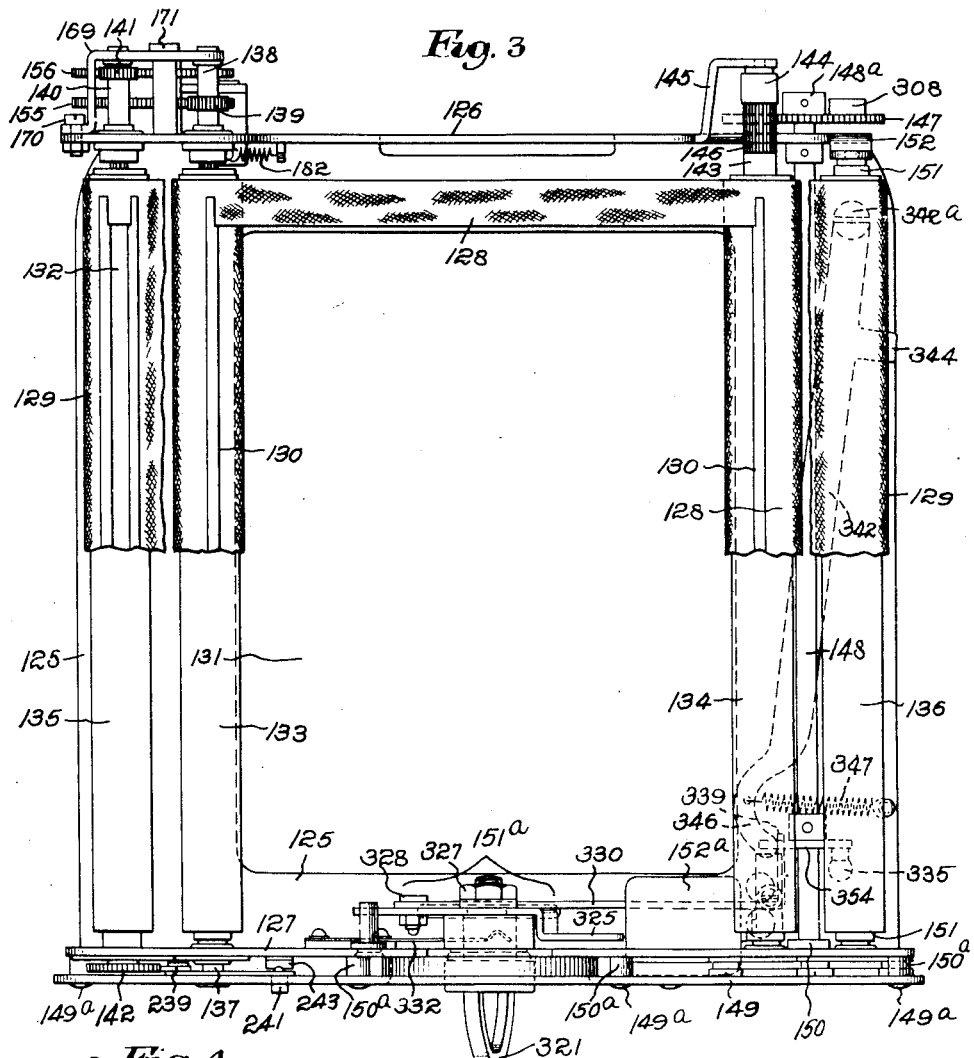
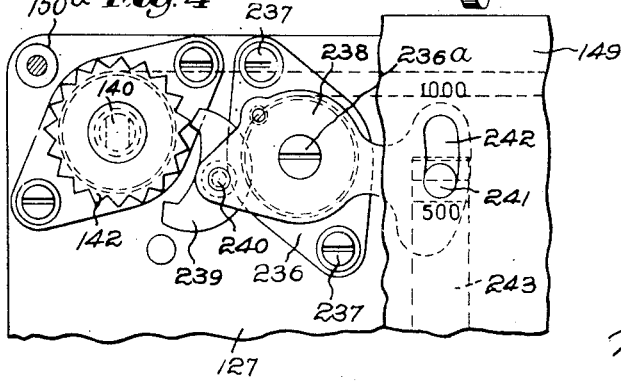
INVENTOR.
Archie H. Gorey,
BY Emery, Booth, Townsend,
Miller and Widdues
Attys.

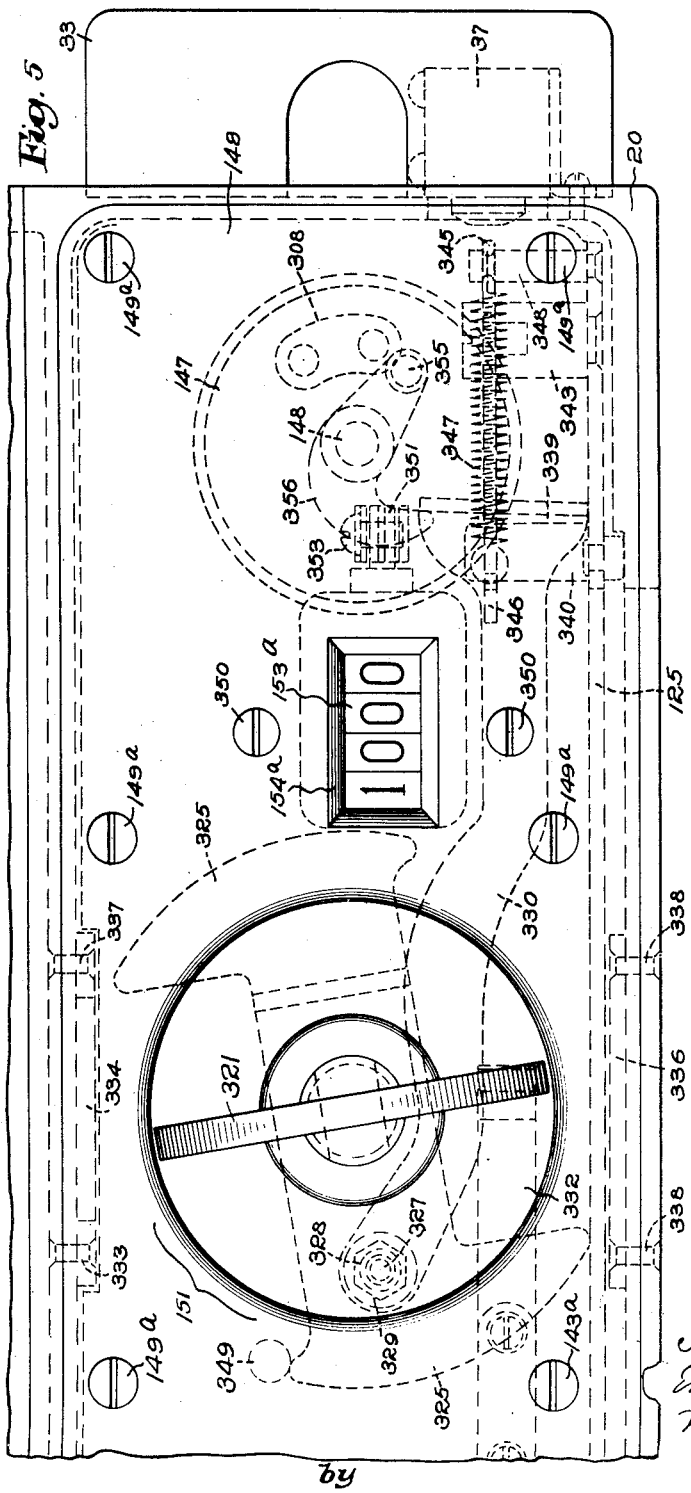

June 13, 1950
A. H. GOREY
2,511,157
PHOTOGRAPHIC CAMERA WITH READILY REMOVABLE CURTAIN SHUTTER UNIT
Original Filed Oct. 23, 1945
9 Sheets-Sheet 5
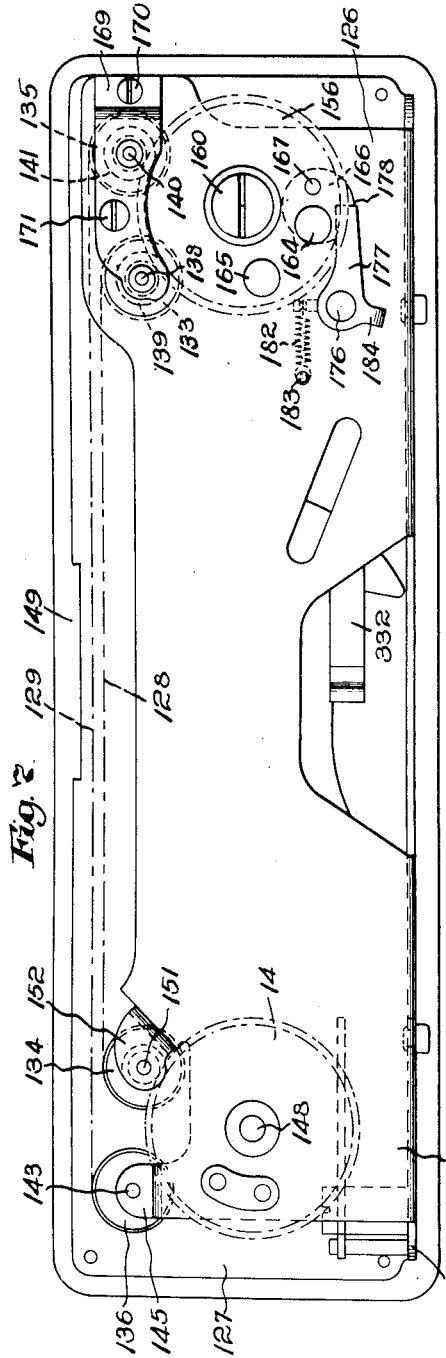
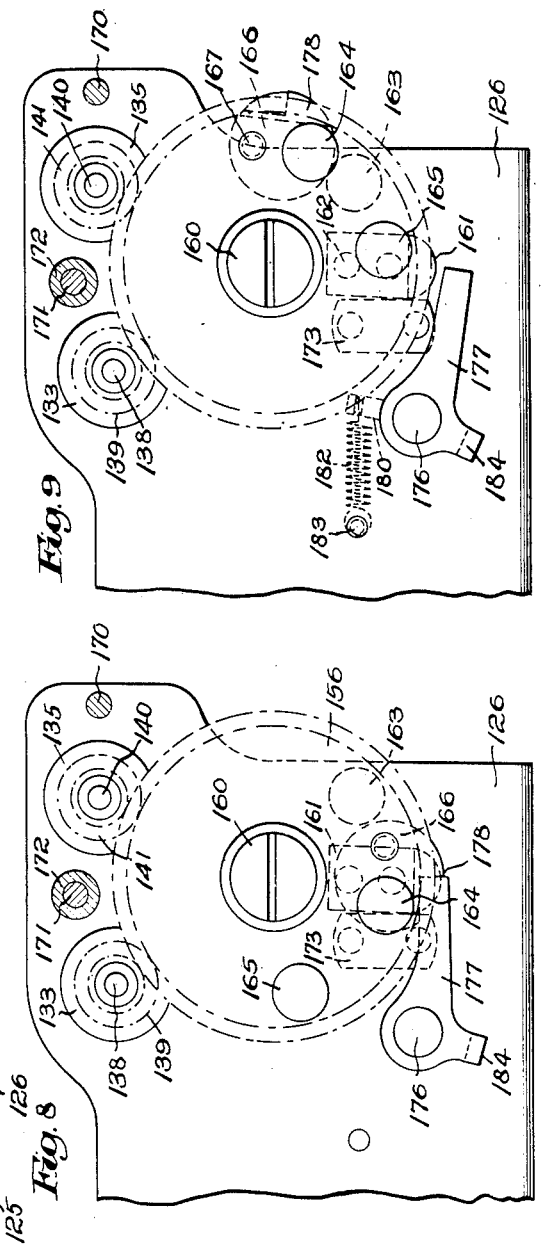
INVENTOR.
Archie H. Gorey,
BY Emery, Booth, Townsend,
Miller and Lowithen
Attys June 13, 1950
A. H. GOREY
2,511,157
PHOTOGRAPHIC CAMERA WITH READILY REMOVABLE CURTAIN SHUTTER UNIT
Original Filed Oct. 23, 1945
9 Sheets-Sheet 6
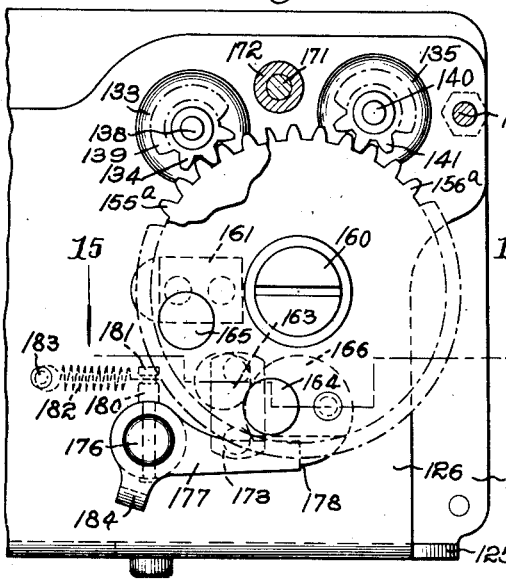
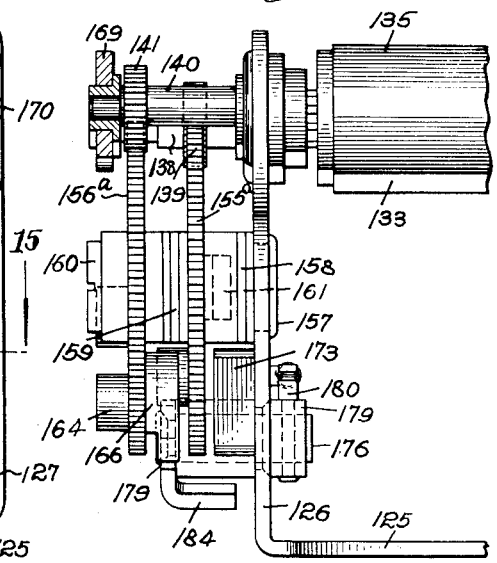
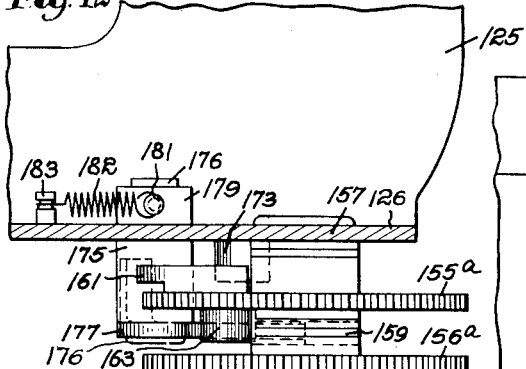
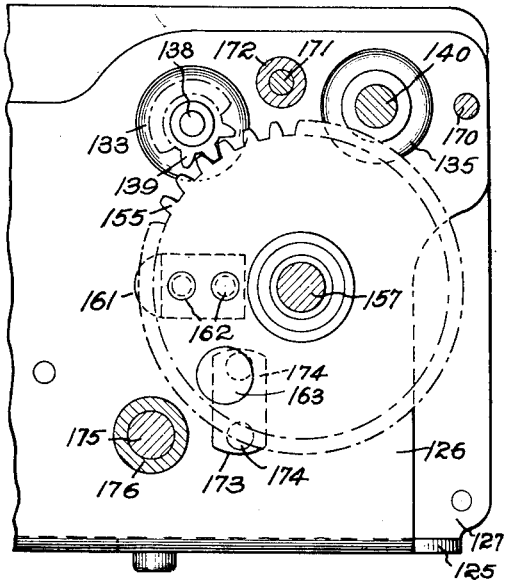
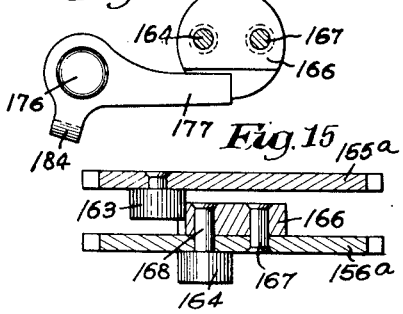
INVENTOR.
Archie H. Gorey,
BY
Attys June 13, 1950
A. H. GOREY
2,511,157
PHOTOGRAPHIC CAMERA WITH READILY
REMOVABLE CURTAIN SHUTTER UNIT
Original Filed Oct. 23, 1945
9 Sheets-Sheet 7
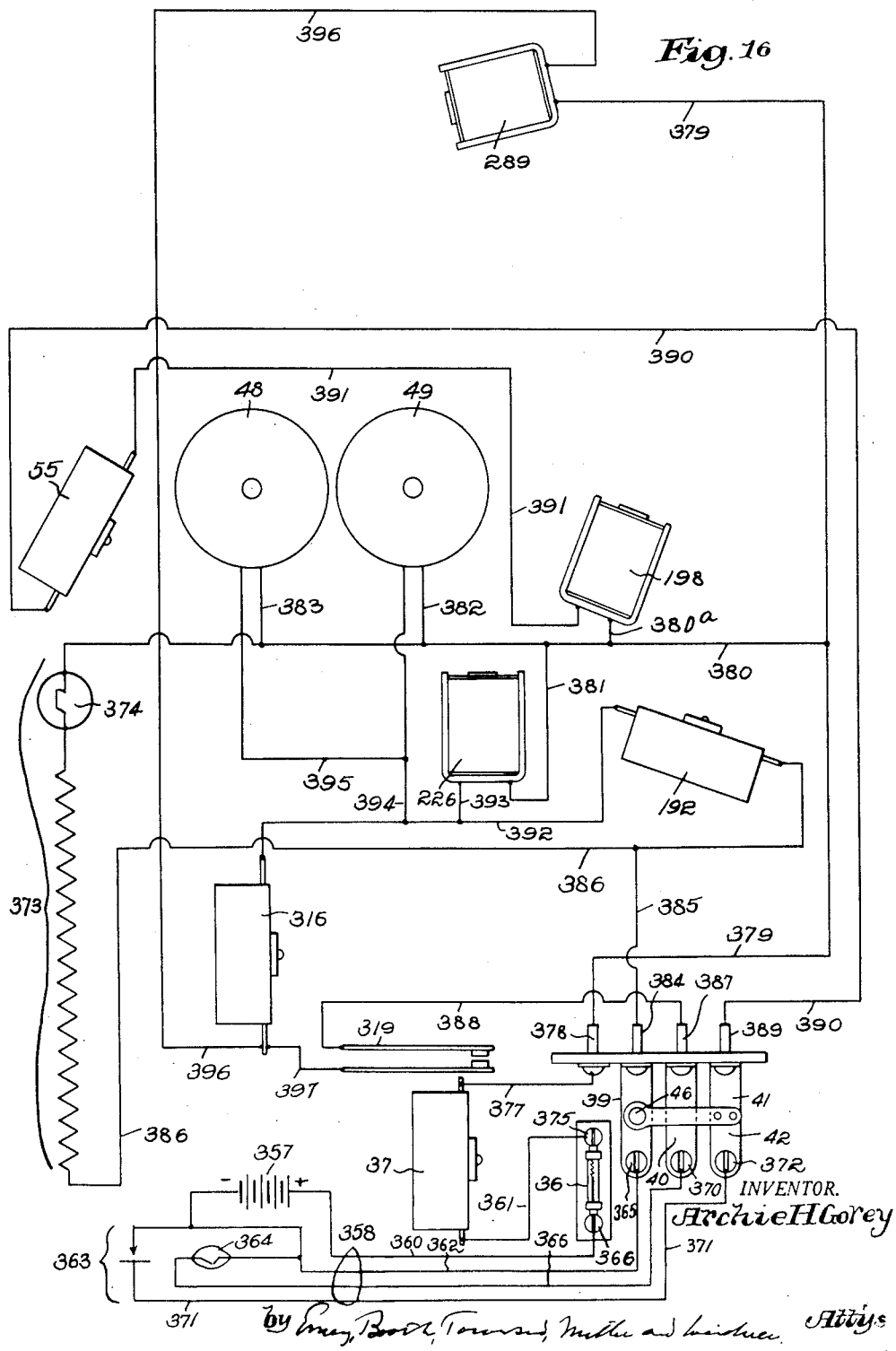
INVENTOR.
Archie H Gorey
by Emery, Booth, Townsend, Miller and Wichner Attys June 13, 1950     A. H. GOREY     2,511,157
PHOTOGRAPHIC CAMERA WITH READILY
REMOVABLE CURTAIN SHUTTER UNIT
Original Filed Oct. 23, 1945     9 Sheets-Sheet 8

INVENTOR.
Archie H. Gorey
BY
Attys

June 13, 1950 A. H. GOREY 2,511,157
PHOTOGRAPHIC CAMERA WITH READILY
REMOVABLE CURTAIN SHUTTER UNIT
Original Filed Oct. 23, 1945 9 Sheets-Sheet 9

INVENTOR.
Archie H. Gorey
BY
Attys

Patented June 13, 1950

2,511,157

UNITED STATES PATENT OFFICE 2,511,157

PHOTOGRAPHIC CAMERA WITH READILY REMOVABLE CURTAIN-SHUTTER UNIT

Archie H. Gorey, Rochester, N. Y., assignor to Graflex, Inc., Rochester, N. Y., a corporation of Delaware Original application October 23, 1945, Serial No. 623,913. Divided and this application July 24, 1947, Serial No. 763,404

10 Claims. (Cl. 95—57)

This application is division A of my co-pending application Ser. No. 623,913, filed October 23, 1945.

This invention relates to a new and improved photographic camera with a readily-removable curtain-shutter unit, and to such removable unit, as well as to certain features of such removable unit.

In order that the principle of the invention may be readily understood, I have disclosed a single embodiment thereof in the accompanying drawings, wherein—

Fig. 1 is a side elevation of the camera, partly in vertical section, to show the magazine structure, the placement of the motors and the lens mounting structure;

Fig. 2 is a vertical section through the camera body in the magazine, showing the position of the film spools, the camera drive motors, the film idler roll, the film measuring roll, the focal plane shutter and the capping curtain, the shutter being in condition for making an exposure;

Fig. 3 is a top plan view of the removable shutter shown removed from the camera, both the shutter curtain and the capping curtain being shown and the mechanism being in condition for making an exposure;

Fig. 4 is a fragmentary detail, partly sectioned respecting the right-hand end of the shutter mechanism viewing Fig. 3, and showing the shutter speed control mechanism;

Fig. 5 is a partial end elevation of the camera body showing the main shutter plate and latching means for locking the shutter mechanism into the camera, and showing the exposure counter;

Fig. 6 is an enlarged detail in longitudinal section of one of the shutter curtain tension rollers;

Fig. 7 is a right-hand end view of the shutter mechanism viewing Fig. 3, and showing the shutter mechanism in condition for making an exposure;

Fig. 8 is an enlarged fragmentary detail of Fig. 7, showing the shutter when in run-down condition;

Fig. 9 is a view similar to Fig. 16, but showing the shutter in fully wound condition and the capping curtain in open condition;

Fig. 10 is a fragmentary, partly sectioned, detail similar to Fig. 8, but showing the shutter in fully rewound condition, the capping curtain being in the capping condition just as the capping curtain is released to run down to open condition;

Fig. 11 is a right-hand end view of Fig. 10;

Fig. 12 is a top plan view of Fig. 10, with some of the parts removed to show the construction of the curtain rewind gears;

Fig. 13 is a view similar to Fig. 10, with the curtain rewind gear and pinion removed so as more clearly to show the structure of the capping curtain rewind mechanism;

Fig. 14 is a detail of the shutter release lever and the shutter rewind gear dog;

Fig. 15 is a horizontal section of Fig. 10, taken on the line 15—15 of Fig. 10, to show the driving connection between the capping curtain rewind gear and the shutter curtain rewind gear;

Fig. 16 is a wiring diagram of the camera;

Figure 17:
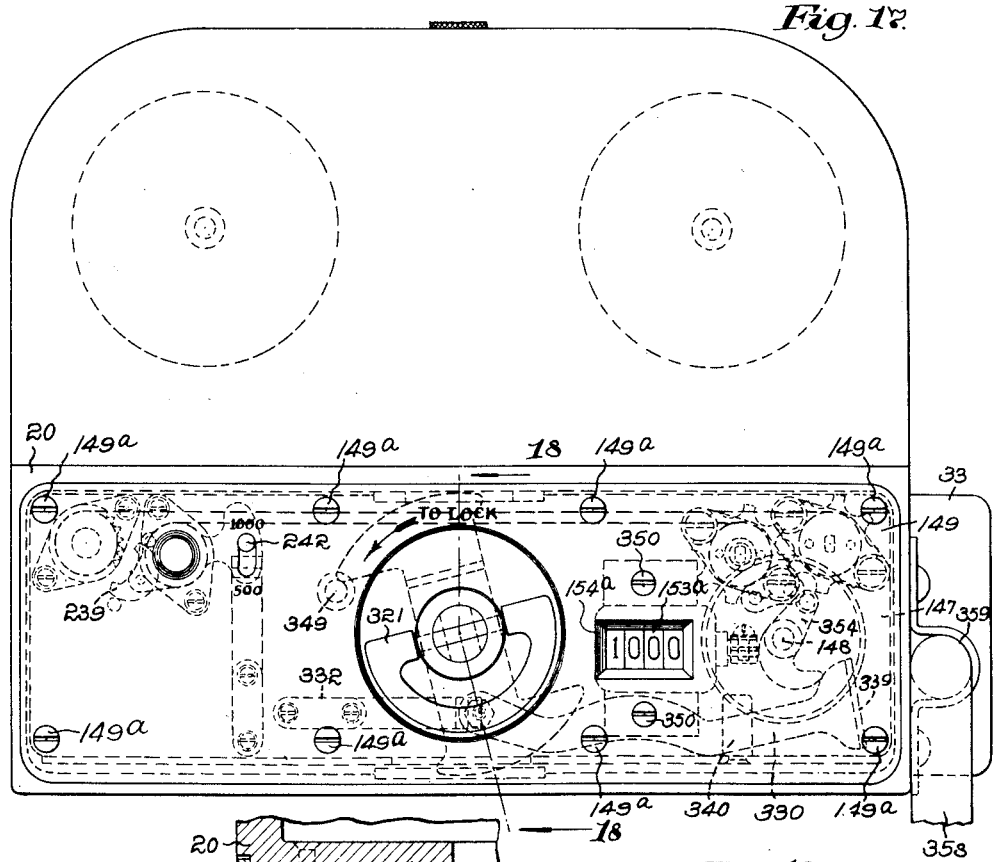
Fig. 17 is a left-hand end view of Fig. 1, the lens cone being removed to show the shutter locking mechanism.

The camera herein disclosed is novel in its design and mechanical construction, in that it is fabricated from sheet metal, using most modern methods of fabrication of these materials. This makes for very high speed production and when built in reasonable quantities permits a very low production cost.

Among the objects of the invention are: to provide an automatic motor-driven camera having a completely removable curtain-shutter assembly; to provide such readily and completely removable curtain-shutter assembly; to provide a camera having an improved automatic capping curtain; and to provide a camera having automatic means to prevent release of the camera shutter when the shutter is in the capped condition. Other novel features of the camera will be evident from the ensuing description.

Referring more particularly to the drawings, and first to Fig. 1 showing a large plan view of the invention with certain parts broken away, the camera is made up of the following basic parts. The camera body is shown at 20, the lens cone at 21, and the camera support ring at 22. The lens cone 21 and the support ring 22 are secured to the camera body by means of screws 23, 23. Threaded into a neck 24 of the lens cone 21 is a lens barrel 25 carrying the usual photographic lens. Attached to the lens cone 21 and extending therefrom is a cylindrical member 26 fastened to said lens cone 21 by rivets 27, 27. Fitted over the cylindrical member 26 is a sunshade tube 28. The lens barrel 25 is fitted with the usual diaphragm adjusting ring 29, and attached to said ring and extending therefrom is a member 30 having a knob 31 extending through a slot 32 in the cylindrical member 26.

Attached to the camera body 20 is a junction box 33 carrying a fuse block 34, fuse clips 35, 35 and a fuse 36. A safety switch, to be subsequently referred to in more detail, is also carried in the junction box 33 and is indicated at 37. The said junction box 33 is equipped with an insulated block 38 having bus bars 39, 40, 41. A cross bar 42, attached to the bus bar 41 by rivets 43, 43, constitutes a switch for operating the camera. The said cross bar 42 is equipped with a contact 44 and the bus bar 39 is equipped with a contact, shown in dotted lines and indicated at 45. Said cross bar 42 is also provided with an insulated operating button 46.

Attached to the right-hand end of the camera body 20 is a mechanism-housing indicated at 47, to which are attached motors 48, 49, to be referred to in detail subsequently. A magazine cover has for its purpose to enclose the sensitized material and to enclose suitable supports and driving and measuring means for said sensitized material.

The shutter assembly or unit

The shutter of the camera is of novel construction. One of the main features thereof allows the shutter assembly or unit in its entirety to be removed from and to be replaced in the camera without disturbing any of the camera mechanism. This is a very important development for cameras used in the armed forces of the United States, in that it permits the rapid substitution of a new shutter, either for the purpose of replacing a damaged shutter or for the purpose of equipping the camera with a shutter having other characteristics than the one removed.

There will now be described the construction of the shutter and its application and relation to the other parts of the camera, and in so doing reference will be made to Figs. 2 to 13, and first to Figs. 2 and 3.

In Fig. 3 the shutter structure is shown as removed from the camera for any purpose. In Fig. 2, the shutter assembly unit or housing is shown in position within the camera structure.

The shutter assembly, unit or housing, which may be of thin sheet metal, is made up of a base plate 125 having an upstanding member 126 on that end which is shown nearest the top of the sheet in Fig. 3, and is subsequently referred to for convenience of description as the upper end. Said assembly, unit or housing has a second or lower upstanding end 127 at the opposite end of the said base plate 125. Said upper and lower upstanding end members 126 and 127 form vertical walls between which are mounted the shutter curtain rolls.

The shutter itself, as best shown in Fig. 2, is made up of two curtains, namely, a capping curtain 128 and a shutter curtain 129, the former having an aperture 130 constituting an opening slightly greater than the opening 131 in the shutter base plate or member 125. The shutter curtain 129 is provided with an aperture 132 which is relatively narrow, the width depending upon the shutter speed desired. In the disclosed embodiment, to which the invention is not restricted, there is provided an aperture approximately $\frac{1}{16}$ of an inch in width, thus allowing a shutter speed of $1/500$ and $1/1000$ of a second.

The capping curtain 128 is wound at one end on the shutter curtain take-up roll 133 and at its outer end on the tension roll 134. The shutter curtain 129 is wound at one end on the shutter curtain rewind roll 135 and at its other end on the shutter curtain tension roll 136. The shutter capping curtain roll 133 is provided with a shaft 137 passing through a suitable bearing in the lower upstanding end member 127. The opposite end of the capping curtain roll 133 is provided with a shaft 138 that passes through a suitable bearing in the upper upstanding member 126. To the shaft 138 there is fastened in any suitable manner a pinion 139. The shutter curtain rewind roll 135 is also provided on its lower end, viewing Fig. 3, with a shaft 140 that is fitted into a suitable bearing in the lower upstanding member 127. The said shaft 140 also extends through a suitable bearing in the upper upstanding member 126. To the upper end of said shaft 140, viewing Fig. 3, is attached a pinion 141 and to its lower end is attached a retard ratchet 142, referred to more fully subsequently.

The capping curtain tension roll 134 is provided with a shaft 143, the lower end whereof, viewing Fig. 3, passes through a suitable bearing in the lower upstanding member 127. The upper end of the said shaft 143 is provided with a bearing 144 in an extension 145 of the said upper upstanding member 126. The said shaft 143 is also provided with a pinion 146 meshing with a capping curtain gear 147 carried on a shaft 148 and keyed thereto by a pin 148a. The lower end of said shaft 148, Fig. 3, rides in a bearing 150 in the lower upstanding member 127. The function of said shaft will be referred to more fully subsequently.

The shutter curtain tension roll 136 is provided with a shaft 151, the lower end whereof is fitted into a suitable bearing carried by the lower upstanding member 127. The upper end of the said shaft 151 is carried in a suitable bearing fitted to an extension 152 integral with the upper upstanding member 126.

The tension rolls

The construction of the tension rolls, which are substantially identical, will next be described, reference being made to Fig. 6, wherein is shown the tension roll 134. As there shown, it is formed as a preferably metallic tube, and to the left-hand end thereof is fitted a bearing member 153 having a suitable hole for the shaft 143. To the right-hand end of the said tube 134 is fitted a bearing plate 154 through which said shaft 143 passes and to which shaft is attached the pinion 146, as already stated. Secured to the shaft 143 is a coiled tension spring 155, the left-hand end whereof is fastened to the bearing plate 153. Also secured to the shaft 143 is a tension spring 156 to the right-hand end whereof is attached said bearing plate 154.

Heretofore for similar structures constituting tension rolls for focal plane shutters, one spring only has been used so far as I am aware, and inasmuch as the over-all length of such spring changes when winding the curtain shutter, a thrust was necessarily always introduced into the assembly. In the disclosed construction, which I believe to be broadly novel for the purpose, the spring is split up into a plurality of units, preferably two, and is stretched a distance equal to the spring elongation when fully wound. Thus the shaft 143 is always held in a central position within the tube or roll 134 and no end thrust is ever imparted to the shaft 143. This construction provides a smoother running shutter and eliminates one of the most annoying variables that has heretofore always existed in focal plane shutters so far as I am aware.

The shutter mechanism

Referring again to Fig. 3, the lower end of the shutter assembly, unit or housing is there shown as provided with a second or cover plate 149 attached to the lower upstanding member 127 by suitable screws 149a, 149a and spaced therefrom by spacer members 150a, 150a. Carried by the cover plate 149 is a locking mechanism which is indicated generally at 151a and which will be more specifically described subsequently. There is also carried by the cover plate 149 an exposure counter 152a, the dial 153a whereof is shown most clearly in Figs. 5 and 17, being visible through an opening 154a of the said cover plate 149.

Reference will next be made to the shutter operating mechanism, shown in Figs. 7 to 15.

Referring first to Fig. 7, an end view of the shutter structure is therein represented as removed from the camera structure and the arrangement of the operating parts is therein clearly evident. In Fig. 7, the shutter is shown as in a wound-up condition ready for making an exposure, the capping curtain 128 having just previously been allowed to run down, thus uncovering the exposure aperture.

The shutter parts will therefore be in the condition shown in Fig. 10, wherein the pinion 139 meshes with the capping curtain rewind gear 155a, and the pinion 141 meshes with the shutter curtain rewind gear 156a. The capping curtain rewind gear 155a and the shutter rewind gear 156a are both mounted on a stud 157 which is securely attached to the upper upstanding member 126 of the shutter assembly, unit or housing. The said stud 157 has a reduced diameter at the left of the upper upstanding member 126, viewing Fig. 3, and upon which the rewind gears 155a and 156a are free to rotate. Also carried by the extending shaft portions of the stud 157 are spacing washers 158, 159.

The assembly, consisting of the shutter rewind gears 155a and 156a and the spacing washers 158, 159, is held to the stud 157 by a retaining screw 160. Secured to the capping curtain rewind gear 155a is a cam block and capping curtain gear stop, shown in dotted lines at 161, being secured by rivets 162, 162. Also secured to the capping curtain rewind gear 155a is a driving stud 163, and attached to the curtain rewind gear 156a is a switch operating pin 164 and a shutter curtain stop pin 165. To the shutter curtain rewind gear 156a a shutter release dog and curtain rewind drive member 166 is attached by a rivet 167 and by a projection 168 of the switch operating pin 164.

The outer end of the capping curtain shaft 138 and the outer end of the shutter curtain shaft 140 are supported by an out-board bearing bracket, indicated at 169 in Figs. 7 and 11. The said bearing bracket 169 is fastened to the upper upstanding member 126 of the shutter assembly, unit or housing by screws 170 and 171. The said bearing bracket 169 is spaced from the upper upstanding member 126 by a suitable bushing 172. Also secured to the said upper upstanding member 126 is a stop plate 173, shown in full lines in Fig. 11 and in dotted lines in Figs. 8 and 9. The said stop plate 173 is secured to the said upper upstanding member 126 by rivets 174, 174. Also fastened to the said upper upstanding member 126 is a bushing 175 through which passes a shaft 176, shown in Figs. 10 and 12. To one end of said shaft 176 there is attached a release pawl or latch member 177 engaging a notch 178 of the shutter release dog and curtain rewind drive member 166. To the oposite end of the shaft 176 a spacing collar 179 is secured by a pin 180 having an end extension 181 to which is hooked a spring 182, the opposite end whereof is attached to a pin 183 on the upper upstanding member 126. The purpose of the spring 182 is to cause the shutter release pawl or latch member 177 to be rotated in a contraclockwise direction viewing Fig. 10. The said shutter release pawl or latch member is provided with a turned-in end 184, best shown in Fig. 11.

In Figs. 2 and 7, the capping curtain 128 and the shutter or aperture curtain 129 are shown in their relation to the shutter rewind gears. In both of said figures, the shutter is shown in a rewound condition ready for making an exposure, the capping curtain 129 having been previously released and allowed to run down to an open condition. The shutter or aperture curtain 129 is held ready for making an exposure. The mechanism will be in the condition shown in Fig. 3.

Shutter speed changing mechanism

Reference will now be made particularly to Figs 3, 4 and 17.

It is often desirable to provide more than one shutter speed when using a curtain having a single fixed aperture, as in the present disclosure of the invention. In accordance with my invention, this result is accomplished by changing the speed of the shutter curtain rewind roll 135 through the use of a retarding mechanism, most clearly shown in Fig. 4. To the lower end of the shaft 140, viewing Fig. 3, is attached the retard ratchet wheel 142, as previously stated, and to the upstanding member 127 of the base plate 125 a plate 236 is fitted by screws 237, 237.

Upon said plate 236 is pivotally mounted, by a screw 236a a pawl or escapement support member 238 carrying an escapement pawl 239 pivoted on a shoulder rivet 240 and free to oscillate thereon. The opposite end of the pawl or escapement support member 238 is provided with a button 241 passing through an opening 242 of the shutter cover 149.

When the mechanism is in the condition shown in Fig. 4, the ratchet wheel 142 will be retarded by the escapement pawl 239 and will cause the shutter curtain to run at a speed that will produce an exposure of $1/500$ of a second. When the button 241 is moved in an upward direction to the position shown in Fig. 17, the escapement pawl 239 is withdrawn from engagement with the ratchet wheel 142, thus allowing the shutter curtain rewind roll 135 to run free, and under such condition an exposure speed of $1/1000$ of a second will be obtained, as is indicated in Fig. 17.

Interlocks, circuit control and counter mechanism

The several interlocks including the circuit diagram will now be described, reference being made to Figs. 1, 3, 5 and 16 to 20.

As previously stated, the shutter mechanism is readily removed from the camera body 20 as a unit, and when removed appear as shown in Fig. 3. In Fig. 5 is a fragmentary showing of the shutter unit in place in the camera. In order to lock the shutter unit securely in position in the camera, there is provided a lock having a shutter operating handle 321, shown in Figs. 5, 17 and 18. In Fig. 5, the shutter unit operating handle 321 is shown in an upstanding or operating position, and in a folded position in Figs. 17 and 18, being also shown in its operating position in dotted lines, Fig. 18. The said shutter handle 321 is pivoted to a stud 322, Fig. 18, by a pin 323. The said stud 322 is fitted into a suitable bushing 324 of the previously described shutter upright member 127.

Attached to the right-hand end of the stud 322 is a locking member 325 held to the stud 322 by a lock washer 326 and a nut 327, and attached to the said locking member 325 is a shoulder stud 328 held thereto by a nut 329 and fitted to the reduced diameter of the said shoulder stud 328 is an arm 330. The inner end of the shoulder stud 328, being the left-hand end thereof viewing Fig. 18, forms a detent 331 engaged by a detent spring 332 when the locking member 325 is in locked condition.

Fitted to the upper wall 333 of the camera body 20 is a latch plate 334, and fitted to the lower wall 335 of the camera body is a second latch plate 336. The said latch plate 334 is held in place by rivets 337, 337, and the latch plate 336 is held in place by rivets 338, 338. When the handle 321 is in the operating position shown in Fig. 5, the locking member 325 is disengaged from the latch plates 334 and 336. The entire shutter unit or assembly can then be removed by sliding it from the camera body. When the handle 321 is in the position shown in Fig. 17 and full lines in Fig. 18, the locking member 325 engages the latch plates 334 and 336, thus securely locking the shutter unit in place in the camera casing. The arm 330 is provided with a flat hook-like formation 339, shown in dotted lines in Figs. 5 and 17 and in full lines in Fig. 20, and it is held in position and guided by studs 340 and 341, most clearly shown in Figs. 5 and 20.

Figure 20:
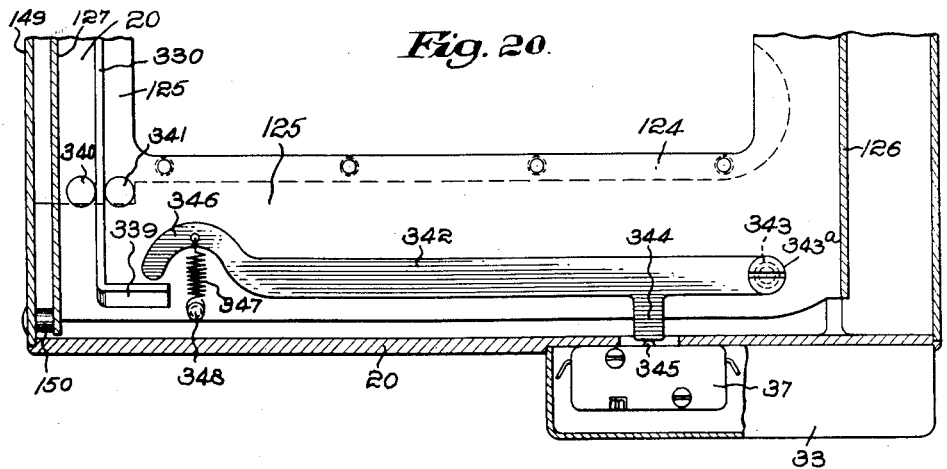
Fig. 20 is a horizontal section through the camera showing the safety switch operating mechanism.

Referring now more especially to Fig. 20, and also to Fig. 3, pivotally attached to the shutter base plate 125 is a switch operating arm 342, being pivoted on a shoulder stud 343 and held thereto by a retaining screw 343a. The said switch operating bar 342 is provided with a projecting finger 344 for engaging the switch operating button 345 of the safety switch 37. The opposite or left-hand end of the switch operating arm 342, viewing Fig. 20 is provided with a hook-like formation 346 engaged by the hook-like formation 339 of the arm 330 when the shutter lock member 321 is turned to the unlocked condition shown in Fig. 5.

This will cause the circuit through the said safety switch 37 to be broken, thus interrupting the circuit through that safety switch, and inasmuch as the said safety switch 37 is in the main camera circuit, the camera will be rendered inoperative when the circuit is in the interrupted condition. As the lock handle 321 is turned in a contraclockwise direction, viewing Fig. 17, the arm 330 will be moved to the right, thus allowing the switch operating arm 342 to be moved in a downward direction, viewing Fig. 20, by spring 347, one end of which is fixed to the said switch operating arm 342 and the opposite end thereof to a pin 348 securely attached to the shutter base member 125.

Also attached to the upstanding wall or member 127 of the base plate 125 of the shutter unit is a pin 349 acting as a stop for the shutter lock member 325 when the latter is turned in a contraclockwise direction to lock the camera shutter unit in place in the camera casing. When in this condition, the circuit to the said safety switch is completed and the camera can then be operated. Also attached to the cover plate 149 by means of screws 350, 350 is the counter 153 perviously referred to.

Figure 19:
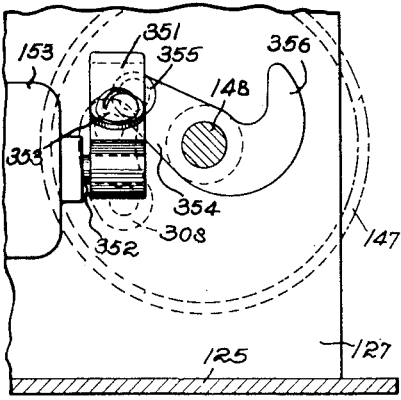
Fig. 19 is an enlarged detail of the exposure counter operating mechanism.

Attached to the right-hand end of the said counter 153, viewing Fig. 5, is a counter operating member 351, shown in full lines in Fig. 19. The said counter operating member 351 is attached to a shaft 352 of said counter 153 and is locked thereto by a screw 353. Attached to the shaft 148, as shown in Fig. 3 and in dotted lines in Fig. 1, is a bell crank member 354, Fig. 19, having attached thereto a counter operating finger 355 that acts upon the counter operating member 351 each time the shutter is operated, thus providing accurate means for counting the number of exposures made by the camera. The opposite end of the said bell crank latch member 354 is provided with a hook-like member 356 engaged by the hook-like formation 339 of the arm 330 when the shutter lock is in the unlocked condition shown in Fig. 5.

The purpose of this arrangement is to cause the said shaft 148 to be rotated slightly clockwise, viewing Fig. 5, thereby to move the cam block 308 out of engagement with a switch operating bar, when the shutter unit is in the unlocked condition in the shutter casing, since if this were not done, it would be impossible properly to put the shutter in operating position in the camera casing, inasmuch as the reverse L formation 307 would interfere with the cam block 308. Therefore, the said cam block 308 is moved out of position sufficiently far so that it will not be interfered with by the said reverse L formation 307. The shutter unit can then be moved to the operating position and, when locked in place in the camera casing, the shaft 148 will be allowed to rotate into its normal position.

*Camera electrical circuit*

In Fig. 16 is shown a circuit diagram of the camera and its operating connections.

The battery supplying the electrical current to the camera is shown at 357, and a cable is represented at 358 connected with the camera body 20 by means of a strap 359 and terminating in the junction box 33. The cable 358 is made up of four wires, of which the wire 360 connects with the positive terminal of the battery 357. The opposite end of said wire 360 is connected to a screw 361 of the fuse 36. A second wire 362 of the cable 358 is connected with the negative side of the battery 357 and also with one side of the operating switch 363 and a signal lamp 364. The said wire 362 is connected at its opposite end with a terminal screw 365 of the bus bar 39. A third wire 366 of the cable 358 has one end connected to the signal lamp 364 and the opposite end to a screw 370 of the bus bar 40. The fourth wire 371 of the cable 358 is connected at one end with the operating switch 363 and at its opposite end to a terminal screw 372 of the bus bar 41.

Also shown in the circuit diagram is a heater 373 having a thermostat control 374 to provide normal operating temperature in the camera at all times. This heater, per se, is not a part of the present invention and is not claimed herein.

Connecting with the terminal screw 375 of the fuse 36 is a wire 361, the opposite end whereof is connected to the terminal on the safety switch 37. To the opposite side of the said safety switch is connected a wire 377, the opposite end whereof is connected to a terminal 378, connected to which is a wire 379 connecting to the film feed solenoid 289. Connected to the said wire 379 is a wire 380 connected to the shutter trip magnet 198 through a short wire 380a and to the shutter clutch magnet 226 through a short wire 381, and to the motor 49 through a short wire 382 and also to the motor 48 through a short wire 383. The wire 380 is also connected with the thermostat 374.

Connected with the terminal 384 is a wire 385 connected to a wire 386, one end of which is connected to the shutter switch 192 and the opposite end is connected to the heater resistance 373. Connected to the terminal 387 is a wire 388 that is itself connected to the signal switch 319. Connected to the terminal 389 is a wire 390 that is connected to one end of the film switch 55. The opposite end of the said film switch has a wire 391 connected to the shutter switch magnet 198. Connected to the shutter switch 192 is a wire 392 that is connected to one terminal of the film clutch switch 316, and said switch and the wire 392 are also connected with the shutter clutch magnet 226 through a short wire 393, and to the motors 48 and 49 through wires 394 and 395. The film feed magnet 289 has a wire 396 connected thereto, the opposite end of which wire is connected to the film clutch switch 316. Connecting the said switch 316 and one end of the signal switch 319 is a short wire 397.

*The removable shutter unit or assembly*

I have described the shutter unit or assembly as insertible into and removable from the camera casing as a unit. This feature has numerous advantages among which are ready accessibility to the shutter mechanism for the purpose of making repairs or for the substitution of a different shutter unit and also simplicity of construction of the entire camera and also facilitating the assemblage of the parts of the camera when building the same.

Referring particularly to dotted lines in Fig. 1 and to Figs. 2, 3, 5 and 18, it will be understood that a lateral wall of the camera casing, being the left-hand wall viewing Fig. 1, has an opening therein, into or through which the shutter unit or assembly is slid into position. Viewing Fig. 2, showing among other parts the shutter unit in transverse section, it will be evident that the said unit is removed from the camera casing by sliding it toward the observer viewing said figure; that is to say, the said shutter unit is slid, in order to withdraw it from the camera casing, in a direction which is downward in Fig. 3, and which is toward the left viewing Fig. 18, wherein are best shown two inner walls of the camera casing 333 and 335, which respectively have the latch plates 334 and 336 secured to their inner faces to receive the ends of the locking member 325 after the shutter unit has been slid inward (i. e. toward the right viewing Fig. 18). When the shutter unit has been slid into its functioning position, the locking member 325 is turned into the position shown in Fig. 18 by movement of the operating handle 321, so as to engage the upper and lower ends of the locking member 325 with the latch plates 334 and 336.

Figure 18:
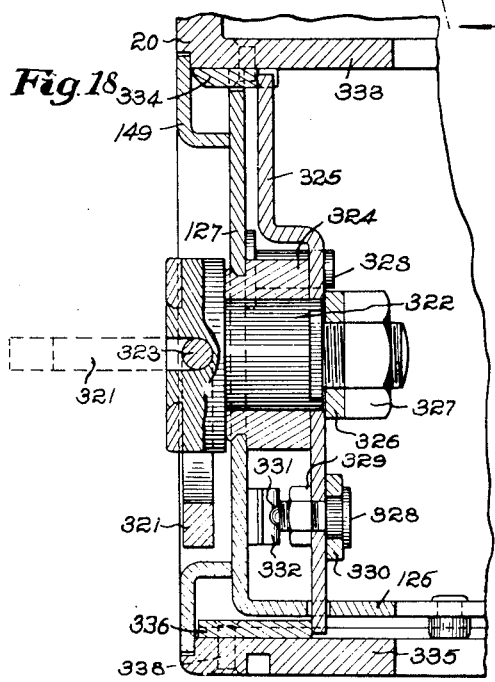
Fig. 18 is a section through Fig. 17 on the line 18—18 thereof.

As clearly described, the shutter unit or assembly is made up of the base plate 125 and the two upstanding end members 126 and 127 of which the member 127 is shown in Fig. 18. All the parts of the shutter unit are received by and supported upon the said base plate 125 and the two upstanding end members 126 and 127. So far as I am aware, it is broadly new to provide a shutter unit or assembly readily removable from within the camera casing without disturbing the other parts of the camera, and this matter is claimed broadly by me. The shutter which comprises the main or essential part of the said removable unit or assembly is a focal plane shutter consisting of an aperture or shutter curtain and a capping curtain, and the camera which is so equipped with a removable shutter unit or assembly is an automatic motor driven camera preferably adapted for making aerial photographs.

Having thus described one illustrative embodiment of the invention, it is to be understood that although specific terms are employed, they are used in a descriptive and generic sense and not for purposes of limitation, the scope of the invention being set forth in the following claims.

I claim:

1. An automatic, electric motor-driven, photographic camera having within the casing thereof an electric circuit for operating the camera parts, said circuit including said motor and also including magnets for controlling shutter-operating members and also including a safety switch, the said camera having a wall of its said casing provided with an opening through which a complete shutter unit assembly may be slid into position and withdrawn therefrom, in combination with such shutter unit assembly having a focal plane shutter which, when said shutter unit assembly is in functioning position within the camera casing, is adapted to be operated through said electric circuit, the said circuit for that purpose having therein a safety switch that is mounted close to a wall of said inserted shutter unit assembly, means in said shutter unit assembly by which said shutter is operable only when a circuit is established through said safety switch, a lock carried by said shutter unit assembly and positioned to be manually operated and having a movable locking member, and means moved by manual movement of said locking member to interrupt the circuit at said safety switch when said locking member is moved manually into unlocking position preparatory to withdrawal of said shutter unit from the said camera casing, and to complete said circuit at said safety switch when the locking member is moved manually into locking position following insertion of said shutter unit within said camera casing.

2. An automatic, electric motor-driven photographic camera in accordance with claim 1, wherein said locking member is pivotally mounted intermediate its ends upon said shutter unit assembly, and wherein the shutter casing has co-operating formations to be engaged by the ends of said locking member to lock said shutter unit assembly in place in said casing, said locking member having an arm mounted thereon, and a safety switch operating arm movably mounted in said shutter unit assembly and having a part which engages said safety switch, and thereby completes the circuit and thus render the said focal plane shutter operable, said safety switch operating arm extending into the path of movement of the said arm mounted upon the locking member, whereby when the said locking member is moved into unlocked position the safety switch operating arm is moved to open said safety switch, thereby breaking said circuit.

3. A shutter unit assembly adapted to be slid into and out from position in a camera casing through an opening in a wall of said casing, said shutter unit assembly having therein a focal plane shutter and having a lock provided with a locking member manually movable to engage a cooperating formation upon the camera casing, whereby the said shutter unit assembly is then locked in position in the camera casing, a movable safety-switch operating arm mounted in said shutter unit assembly and having a formation which, when said switch operating arm is moved in one direction by said locking member, engages a safety switch in the camera casing to close an electric circuit in said camera casing that controls the operation of said focal plane shutter of the said shutter unit assembly, the said switch operating arm extending into the path of movement of said locking member, so as to be operated by movement of said locking member to open said safety switch when the locking member is moved into unlocking position for removal of said shutter unit assembly.

4. A shutter unit assembly in accordance with claim 3, wherein said movable safety-switch operating arm has a spring acting thereon and tending to move the said operating arm into safety-switch closing position.

5. A shutter unit assembly in accordance with claim 3, wherein the said shutter unit assembly is provided with a base plate and two parallel spaced members upstanding therefrom, in which members rolls carrying the focal plane shutter are mounted, a cover plate also upstanding from said base plate parallel to and slightly spaced from one of said two upstanding members, and an exposure counter carried by said cover plate and constituting a part of said shutter unit assembly.

6. A shutter unit assembly in accordance with claim 3, wherein the said shutter unit assembly is provided with a base plate and two parallel spaced members upstanding therefrom, and wherein curtain rolls for an apertured curtain and for a capping curtain constituting the focal plane shutter are mounted in the said parallel spaced members, and wherein retarding mechanism to change shutter speeds is carried by a shaft of one of said curtain rolls, and constituting a part of the shutter unit assembly.

7. A shutter unit assembly in accordance with claim 3, wherein the said shutter unit assembly is provided with a base plate and two parallel spaced members upstanding therefrom, and wherein curtain rolls for an apertured curtain and for a capping curtain constituting the focal plane shutter are mounted in the said parallel spaced members, and including a shutter curtain rewind roll, and wherein an escapement ratchet wheel is mounted upon an outer end of such rewind roll, and wherein a manually-operable cooperating pawl is carried by said shutter unit assembly and is positioned on a wall of said unit assembly to engage operatively with such escapement ratchet wheel.

8. A shutter unit assembly in accordance with claim 3, wherein the said shutter unit assembly is provided with a base plate and two parallel spaced members upstanding therefrom, in which members rolls carrying the focal plane shutter are mounted, a cover plate also upstanding from said base plate parallel to and slightly spaced from one of said two upstanding members, and an exposure counter carried by said cover plate and constituting a part of said shutter unit assembly, and wherein there is provided a counter operating member and a cooperating bell crank member to engage and operate said counter operating member.

9. A shutter unit assembly in accordance with claim 3, wherein the said shutter unit assembly is provided with a base plate and two parallel spaced members upstanding therefrom, in which members rolls carrying the focal plane shutter are mounted, a cover plate also upstanding from said base plate parallel to and slightly spaced from one of said two upstanding members, and an exposure counter carried by said cover plate and constituting a part of said shutter unit assembly, and wherein there is provided a counter operating member and a cooperating bell crank member to engage and operate said counter operating member, and wherein, when the said shutter locking member is moved into unlocked condition to permit withdrawal of said unit assembly, it acts to move said bell crank member that acts upon said counter operating member.

10. An automatic, electric motor-driven, photographic camera having within the casing thereof an electric circuit for operating the camera parts, said circuit including said motor and also including magnets for controlling shutter-operating members and also including a safety switch, the said camera having a wall of its said casing provided with an opening through which a complete shutter unit assembly may be slid into position and withdrawn therefrom, in combination with such shutter unit assembly having a focal plane shutter which, when said shutter unit assembly is in functioning position within the camera casing, is adapted to be operated through said electric circuit, the said circuit for that purpose having therein a safety switch that is mounted close to a wall of said inserted shutter unit assembly, the said shutter being operable only when an electric circuit is established through said safety switch, and a lock for and carried by the said shutter unit assembly and acting to interrupt the said electric circuit at said safety switch when said lock is operated incident to the withdrawal of the said shutter unit assembly from the camera casing.

ARCHIE H. GOREY.

REFERENCES CITED

The following references are of record in the file of this patent:

UNITED STATES PATENTS

| Number | Name | Date |
| --- | --- | --- |
| 313,677 | Loeffler | Mar. 10, 1885 |
| 1,075,751 | Barberie | Oct. 14, 1913 |
| 1,554,145 | Foothorap | June 30, 1925 |
| 1,648,948 | Johnson | Nov. 15, 1927 |
| 1,700,082 | Schemmel | Jan. 22, 1929 |
| 1,707,849 | Fairchild | Apr. 2, 1929 |
| 1,963,095 | Petit et al. | June 19, 1934 |
| 1,965,507 | Meyers | July 3, 1934 |
| 2,122,671 | Leitz et al. | July 5, 1938 |

FOREIGN PATENTS

| Number | Country | Date |
| --- | --- | --- |
| 9,599 | Great Britain | of 1902 |
| 222,548 | Great Britain | Sept. 29, 1924 |
| 576,222 | Great Britain | Mar. 25, 1946 |